United States Patent
Gonzalez Berrocal

(10) Patent No.: US 11,524,660 B2
(45) Date of Patent: Dec. 13, 2022

(54) TRACTOR TRAILER ROOF HEATER APPARATUS

(71) Applicant: Antonio Gonzalez Berrocal, Bristol, PA (US)

(72) Inventor: Antonio Gonzalez Berrocal, Bristol, PA (US)

(*) Notice: Subject to any disclaimer, the term of this patent is extended or adjusted under 35 U.S.C. 154(b) by 873 days.

(21) Appl. No.: 16/414,509

(22) Filed: May 16, 2019

(65) Prior Publication Data

US 2020/0361423 A1 Nov. 19, 2020

(51) Int. Cl.
| | |
|---|---|
| *B60S 1/66* | (2006.01) |
| *B60S 1/56* | (2006.01) |
| *B60S 3/04* | (2006.01) |
| *B62D 53/06* | (2006.01) |
| *B62D 25/06* | (2006.01) |
| *B60J 7/00* | (2006.01) |

(52) U.S. Cl.
CPC ............... *B60S 1/66* (2013.01); *B62D 25/06* (2013.01); *B62D 53/06* (2013.01); *B60J 7/0092* (2013.01); *B60S 1/56* (2013.01); *B60S 3/04* (2013.01); *H05B 2214/02* (2013.01)

(58) Field of Classification Search
CPC ..... B60S 1/56; B60S 1/66; B60S 3/04; B62D 25/06; B62D 53/00; B62D 53/06; H05B 3/36; H05B 3/40; H05B 3/48; H05B 2214/02; B60R 16/03; B60J 10/60
USPC ....... 219/202, 628, 629, 630, 703, 713, 714; 296/1.01, 180.2, 180.4; 165/41
See application file for complete search history.

(56) References Cited

U.S. PATENT DOCUMENTS

| | | |
|---|---|---|
| D514,209 S | 1/2006 | Evans |
| 7,783,400 B1 | 8/2010 | Zimler |
| 2008/0184506 A1* | 8/2008 | Dix ............. B60S 1/66 15/97.3 |
| 2008/0246252 A1 | 10/2008 | McDonald |
| 2011/0006049 A1 | 1/2011 | Thompson, Jr. |
| 2011/0036823 A1 | 2/2011 | Nelson |
| 2012/0193067 A1* | 8/2012 | Miller ............. B62D 25/06 165/41 |
| 2012/0193338 A1 | 8/2012 | Sullivan |
| 2015/0282250 A1 | 10/2015 | Smith |
| 2017/0238363 A1* | 8/2017 | Oskwarek .......... B60S 1/026 219/491 |
| 2018/0079393 A1* | 3/2018 | Reid ................ B60R 16/03 |
| 2019/0061704 A1* | 2/2019 | Carroll .............. B60S 1/66 |
| 2019/0263361 A1* | 8/2019 | Carroll .............. B60S 1/66 |

* cited by examiner

*Primary Examiner* — Dennis H Pedder
*Assistant Examiner* — Joyce Eileen Hill

(57) ABSTRACT

A tractor trailer roof heater apparatus for preventing snow and ice accumulation includes a reservoir configured to hold heater oil within an inner cavity and configured to be coupled to a tractor trailer. A heater is coupled to a bottom side of the reservoir within the inner cavity and is configured to heat the heater oil. A pump is coupled to a top side of the reservoir and has a draw tube extending through a pump aperture into the inner cavity to draw the heater oil from the reservoir and push it through an outlet aperture through an oil tube. The oil tube is configured to be coupled within a roof of the tractor trailer to carry hot heater oil from the pump and then return the heater oil to the reservoir. A power supply is coupled to the pump and a thermostat is coupled to the reservoir.

6 Claims, 3 Drawing Sheets

TRACTOR TRAILER ROOF HEATER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to tractor trailer accessories and more particularly pertains to a new tractor trailer accessory for preventing snow and ice accumulation.

BRIEF SUMMARY OF THE INVENTION

An embodiment of the disclosure meets the needs presented above by generally comprising a reservoir having a front side separated from a back side, a top side separated from a bottom side, and a left side separated from a right side forming an inner cavity. The inner cavity is configured to hold heater oil. The top side has a pump aperture and a return aperture extending into the inner cavity. The reservoir is configured to be coupled to a front end of a tractor trailer. A heater is coupled to the bottom side of the reservoir within the inner cavity and is configured to heat the heater oil. A pump is coupled to the top side of the reservoir and has a draw tube extending through the pump aperture into the inner cavity and terminating proximal the bottom side. The pump is configured to draw the heater oil from the reservoir and push it through an outlet aperture. An oil tube has a first end coupled to the outlet aperture and a second end coupled to the return aperture. The oil tube is configured to be coupled within a roof of the tractor trailer to carry hot heater oil from the pump and then return the heater oil to the reservoir. A power supply is coupled to the pump. The power supply is in operational communication with the pump and the heater and is configured to draw power from an electrical system of the tractor trailer. A thermostat is coupled to the reservoir and is in operational communication with the power supply and the reservoir to engage the power supply to maintain the heater oil at a predetermined temperature.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
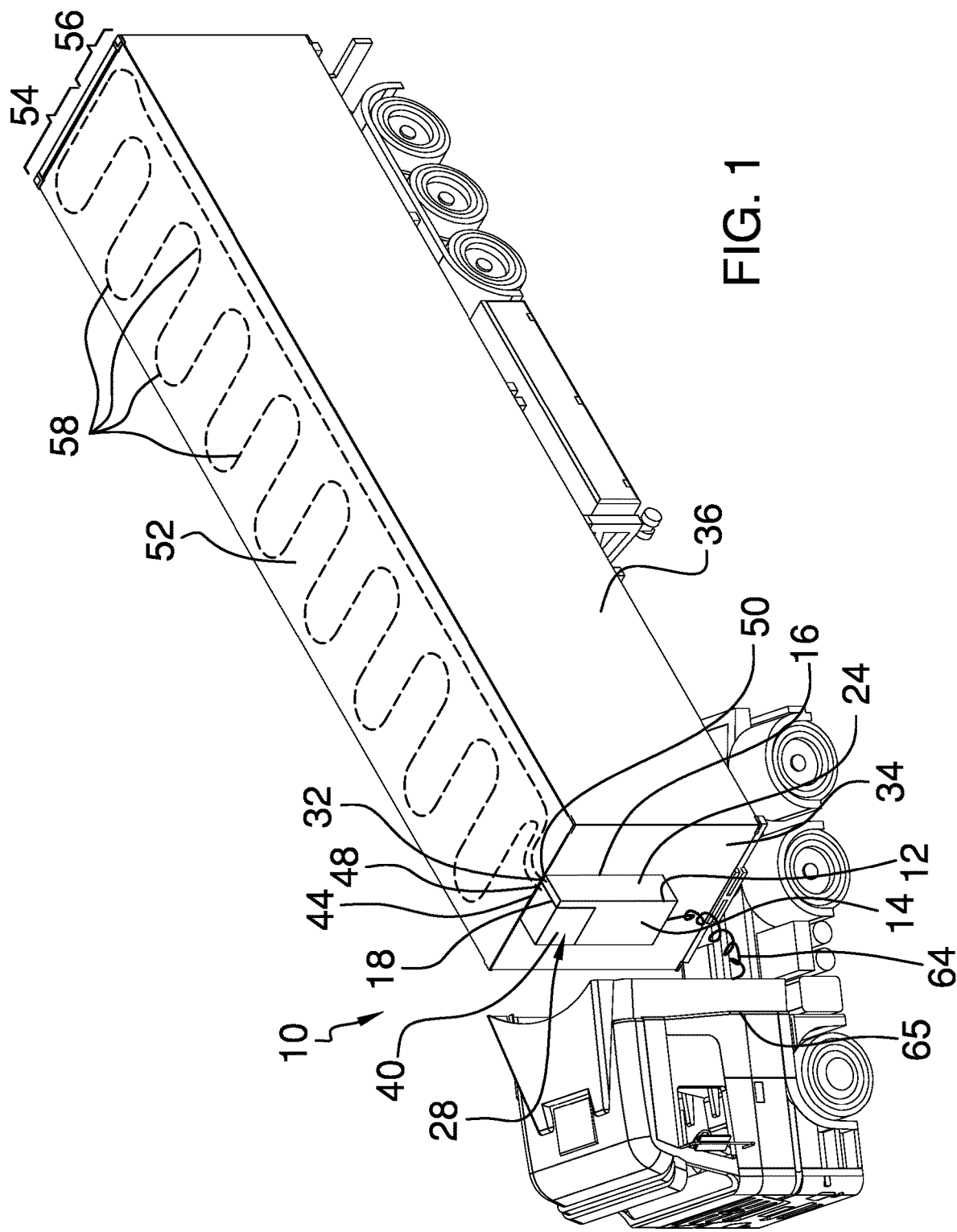
FIG. 1 is an isometric in-use view of a tractor trailer roof heater apparatus according to an embodiment of the disclosure.
Figure 2:
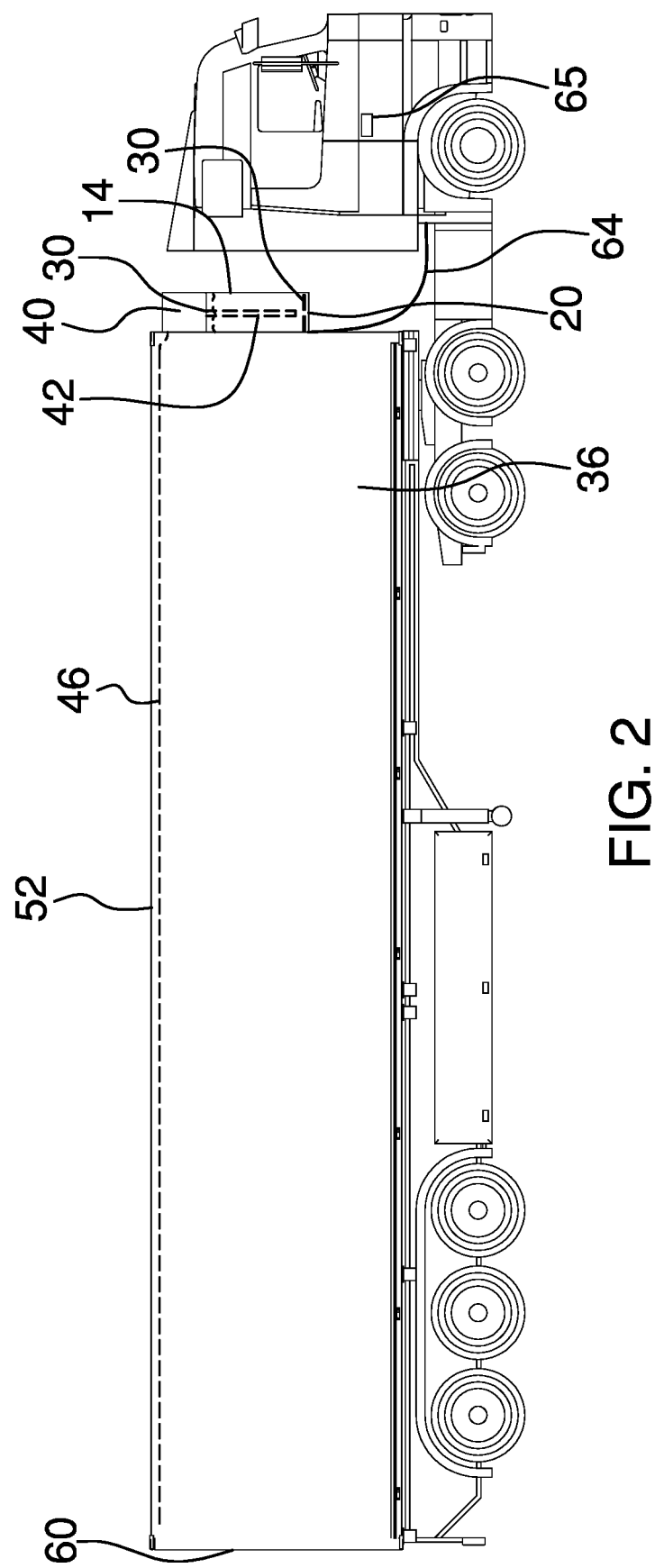
FIG. 2 is a side elevation in-use view of an embodiment of the disclosure.
Figure 3:
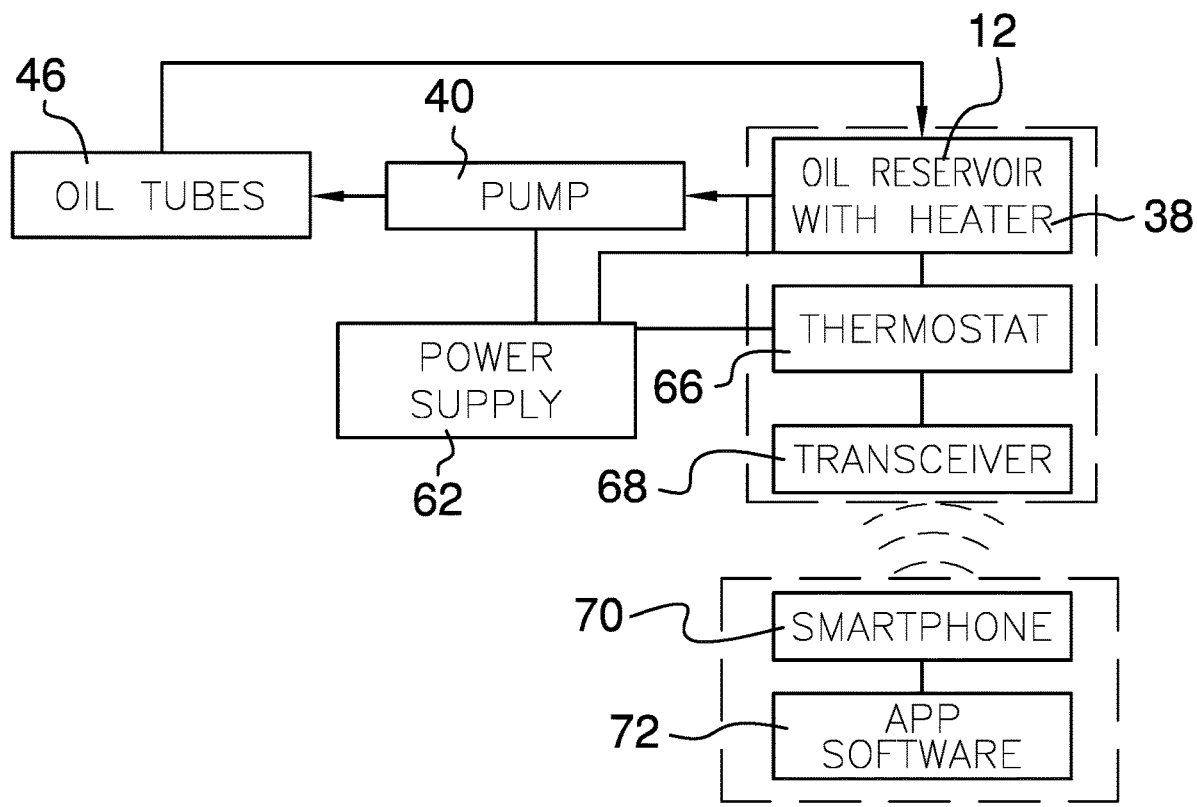
FIG. 3 is a block diagram of an embodiment of the disclosure.

With reference now to the drawings, and in particular to FIGS. 1 through 3 thereof, a new tractor trailer accessory embodying the principles and concepts of an embodiment of the disclosure and generally designated by the reference numeral 10 will be described.

As best illustrated in FIGS. 1 through 3, the tractor trailer roof heater apparatus 10 generally comprises a reservoir 12 having a front side 14 separated from a back side 16, a top side 18 separated from a bottom side 20, and a left side 22 separated from a right side 24 to form an inner cavity 26. The reservoir 12 is rectangular prismatic excepting a notch 28 extending into the top side 18 and the left side 22. The notch 28 has a notch width, a notch depth, and a notch length. The inner cavity 26 is configured to hold heater oil. The top side 18 has a pump aperture 30 and a return aperture 32 extending into the inner cavity 26. The reservoir 12 is configured to be coupled to a front end 34 of a tractor trailer 36. A heater 38 is coupled to the bottom side 20 of the reservoir within the inner cavity 26 and is configured to heat the heater oil.

A pump 40 is coupled to the top side 18 of the reservoir. The pump 40 is rectangular prismatic and has a pump width, a pump depth, and a pump length equal to the notch width, the notch depth, and the notch length. The pump 40 is thus arranged to fill the notch 28. The pump 40 has a draw tube 42 extending through the pump aperture 30 into the inner cavity 26 and terminating proximal the bottom side 20. The pump 40 is configured to draw the heater oil from the reservoir 26 and push it through an outlet aperture 44. An oil tube 46 is coupled to the pump 40. The oil tube 46 has a first end 48 coupled to the outlet aperture 44 and a second end 50 coupled to the return aperture 32. The oil tube 46 is configured to be coupled within a roof 52 of the tractor trailer to carry hot heater oil from the pump 40 and then return the heater oil to the reservoir 26. The oil tube 46 has a coil section 54 and a return section 56. The coil section 54 comprises a plurality of U-shaped coils 58 configured to extend from the first end 48 to adjacent a back end 60 of the tractor trailer and the return section 56 is straight and configured to extend from the coil section 54 to the second end 50.

A power supply 62 is coupled to the pump 40 and is in operational communication with the pump 40 and the heater 38. The power supply 62 has a coiled powerline 64 extending from the bottom side 20 of the reservoir and configured to connect to a cab 65 of the tractor trailer to draw power from an electrical system of the tractor trailer 36. A thermostat 66 is coupled to the reservoir 12 and is in operational communication with the power supply 62 and the reservoir 12 to engage the power supply 62 to maintain the heater oil at a predetermined temperature. A transceiver 68 is coupled to the thermostat 66 and is in operational communication with the thermostat 66 and configured to connect with a smartphone 70 having an application 72 to control the thermostat 66 and the power supply 62.

In use, the application 72 is used to control the thermostat 66 or to engage the power supply 62 to control the temperature of the heater oil and thus the roof 52 of the tractor trailer to melt ice and snow that has accumulated, or to prevent accumulation.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tractor trailer roof heater apparatus comprising:
a reservoir, the reservoir having a front side separated from a back side, a top side separated from a bottom side, and a left side separated from a right side forming an inner cavity, the inner cavity being configured to hold heater oil, the top side having a pump aperture and a return aperture extending into the inner cavity, the reservoir being configured to be coupled to a front end of a tractor trailer;
a heater coupled to the reservoir, the heater being coupled to the bottom side within the inner cavity, the heater being configured to heat the heater oil;
a pump coupled to the reservoir, the pump being coupled to the top side of the reservoir and having a draw tube extending through the pump aperture into the inner cavity and terminating proximal the bottom side, the pump being configured to draw the heater oil from the reservoir and push it through an outlet aperture;
an oil tube coupled to the pump, the oil tube having a first end coupled to the outlet aperture and a second end coupled to the return aperture, the oil tube being configured to be coupled within a roof of the tractor trailer to carry hot heater oil from the pump and then return the heater oil to the reservoir;
a power supply coupled to the pump, the power supply being in operational communication with the pump and the heater, the power supply being configured to draw power from an electrical system of the tractor trailer;
a thermostat coupled to the reservoir, the thermostat being in operational communication with the power supply and the reservoir to engage the power supply to maintain the heater oil at a predetermined temperature; and
the reservoir being rectangular prismatic excepting a notch extending into the top side and the left side, the notch having a notch width, a notch depth, and a notch length, the pump being rectangular prismatic, the pump having a pump width, a pump depth, and a pump length equal to the notch width, the notch depth, and the notch length, the pump being arranged to till the notch.

2. The tractor trailer roof heater apparatus of claim 1 further comprising a transceiver coupled to the thermostat, the transceiver being in operational communication with the thermostat and configured to connect with a smartphone having an application to control the thermostat.

3. The tractor trailer roof heater apparatus of claim 1 further comprising the oil tube having a coil section and a return section, the coil section comprising a plurality of U-shaped coils configured to extend from the first end to adjacent a back end of the tractor trailer, the return section being straight and configured to extend from the coil section to the second end.

4. The tractor trailer roof heater apparatus of claim 1 further comprising the power supply having a powerline extending from the bottom side of the reservoir, the powerline being configured to connect to a cab of the tractor trailer.

5. The tractor trailer roof heater apparatus of claim 4 further comprising the powerline being coiled.

6. A tractor trailer roof heater apparatus comprising:
a reservoir, the reservoir having a front side separated from a back side, a top side separated from a bottom side, and a left side separated from a right side forming an inner cavity, the reservoir being rectangular prismatic excepting a notch extending into the top side and the left side, the notch having a notch width, a notch depth, and a notch length, the inner cavity being configured to hold heater oil, the top side having a pump aperture and a return aperture extending into the inner cavity, the reservoir being configured to be coupled to a front end of a tractor trailer;
a heater coupled to the reservoir, the heater being coupled to the bottom side within the inner cavity, the heater being configured to heat the heater oil;
a pump coupled to the reservoir, the pump being coupled to the top side of the reservoir, the pump being rectangular prismatic, the pump having a pump width, a pump depth, and a pump length equal to the notch width, the notch depth, and the notch length, the pump being arranged to fill the notch, the pump having a draw tube extending through the pump aperture into the inner cavity and terminating proximal the bottom side, the pump being configured to draw the heater oil from the reservoir and push it through an outlet aperture;

an oil tube coupled to the pump, the oil tube having a first end coupled to the outlet aperture and a second end coupled to the return aperture, the oil tube being configured to be coupled within a roof of the tractor trailer to carry hot heater oil from the pump and then return the heater oil to the reservoir, the oil tube having a coil section and a return section, the coil section comprising a plurality of U-shaped coils configured to extend from the first end to adjacent a back end of the tractor trailer, the return section being straight and configured to extend from the coil section to the second end;

a power supply coupled to the pump, the power supply being in operational communication with the pump and the heater, the power supply having a coiled powerline extending from the bottom side of the reservoir, the powerline being configured to connect to a cab of the tractor trailer and draw power from an electrical system of the tractor trailer;

a thermostat coupled to the reservoir, the thermostat being in operational communication with the power supply and the reservoir to engage the power supply to maintain the heater oil at a predetermined temperature; and a transceiver coupled to the thermostat, the transceiver being in operational communication with the thermostat and configured to connect with a smartphone having an application to control the thermostat.

\* \* \* \* \*